Patented Feb. 12, 1952

UNITED STATES PATENT OFFICE

2,585,409

2,585,409

METHOD FOR PREPARING GAMMA-ETHYL-GAMMA-METHYLPIMELATES

Margaret I. Robinson, Philadelphia, and Robert W. Auten, Jenkintown, Pa., assignors to Rohm & Haas Company, Philadelphia, Pa., a corporation of Delaware No Drawing. Application April 5, 1949, Serial No. 85,734

1 Claim. (Cl. 260—485)

The invention deals with esters of gamma-ethyl-gamma-methylpimelic acid and monohydric alcohols, particularly saturated alcohols of four to nine carbon atoms.

The preparation of gamma-acetyl-gamma-methylpimelic acid and its esters has been described in U. S. Patents Nos. 2,342,606, issued February 22, 1944, and 2,374,327, issued April 24, 1945. It has been found that these esters are valuable softening and plasticizing agents, having good compatibility with a variety of plastic and resinous materials. Yet they exhibit certain effects which are at times unwanted. It would be desirable, for instance, to improve upon their resistance to light and to improve the low temperature behavior of plastics which have been modified therewith.

We have found that these and other properties can be considerably improved by modification of the gamma-acetyl-gamma-methylpimelates with retention of many desirable characteristics by conversion of the acetyl group to an ethyl group. The acid and esters thereof which are then obtained are new and have increased utility as softeners and plasticizers.

We have found that gamma-acetyl-gamma-methylpimelic acid is converted to gamma-ethyl-gamma-methylpimelic acid by preferential or controlled reduction. A suitable method comprises mixing together gamma-acetyl-gamma-methylpimelic acid or a salt thereof and a molecular excess of an alkali metal alcoholate or hydroxide, adding to the resulting mixture an excess of hydrazine hydrate, and heating this reaction mixture with removal of water and excess hydrazine hydrate.

The alcoholate may be used as a separately prepared product. Alternatively, it may be prepared by dissolving an alkali metal in an excess of an alcohol, particularly an alcohol such as a heptyl, octyl, or nonyl alcohol. A similar result is obtained by the addition of sodium or potassium hydroxide to a high-boiling alcohol.

The reaction is best carried out in the presence of a high-boiling organic solvent. Particularly suitable are heptyl, octyl, and nonyl alcohols, ethylene glycol, diethylene glycol, ethoxyethanol, butoxyethanol, ethoxyethoxyethanol, and the like. These permit use of alkali metal alcoholates, such as sodium methoxide or potassium ethoxide, or alkali metals, or alkali metal hydroxides and allow the temperature of the reaction mixture to be maintained at 150° C. and more to permit complete removal of water and finally excess hydrazine hydrate. The temperature is then held sufficiently high to complete reduction and elimination of nitrogen, temperatures of 180° C. to 220° C. being suitable at this stage. The acetyl group is reduced to ethyl without disruption of the molecule or loss of the other functional groups.

While the gamma-ethyl-gamma-methylpimelic acid may be separated in a number of ways, we have found that the steps of recovery through formation of an alkaline earth metal salt and metathesis of this salt with sulfuric acid give an excellent yield of the acid. It may then be esterified by conventional procedures, such as reaction with an alcohol in the presence of an acid catalyst and azeotropic removal of water of reaction with a solvent such as toluene, naphtha, or the like.

As an alcohol to yield the esters of particular interest, there may be used butyl, isobutyl, sec.-butyl, amyl, isoamyl, sec.-amyl, hexyl, 2-ethylbutyl, heptyl, isoheptyl, capryl, octyl, 2-ethylhexyl, nonyl, isononyl, 2,4,4-trimethylhexyl, 2,2,4,4-tetramethylpentyl, or similar non-tertiary; i. e., secondary or primary, saturated, aliphatic, monohydric alcohol. It may be further pointed out that esters of such alcohols as methyl, ethyl, propyl, dodecyl, allyl, methallyl, crotyl, benzyl, tetrahydrofurfuryl, cyclohexyl, terpenyl, and the like may also be prepared.

The following examples are given to illustrate typical preparations of gamma-ethyl-gamma-methylpimelic acid and its esters.

Example 1

Into a reaction vessel equipped with stirrer, thermometer, condenser, water separator, and dropping funnel there were added 432 parts by weight of gamma-acetyl-gamma-methylpimelic acid, 890 parts of ethylene glycol, and 336 parts of powdered potassium hydroxide. The mixture was stirred and heated until the potassium hydroxide had dissolved. There was then slowly added 85% hydrazine hydrate in a total amount of 180 parts. The mixture was heated under reflux for 1.5 hours. Water and excess hydrazine hydrate were taken off through the water separator and heating was continued until the batch temperature reached about 200° C. The batch was then heated under reflux for five hours.

By this procedure the gamma-acetyl-gamma-methylpimelic acid was almost quantitatively converted into gamma-ethyl-gamma-methylpimelic acid.

The reaction mixture was cooled, diluted with 1000 parts of water, and neutralized with concentrated hydrochloric acid. There was then added 400 parts of calcium chloride dissolved in 300 parts of water. The reaction mixture was stirred and heated. The precipitate which formed was separated by filtration and washed with hot water. The filtrate was treated with more calcium chloride solution and a small amount of the calcium salt thus recovered therefrom. This was combined with the main lot of calcium salt.

This salt was then taken up in a small amount of water and a solution of 292 parts of sulfuric acid in 2000 parts of water was added thereto. The mixture was stirred and heated. The mixture was filtered and the filtrate was cooled. The gamma-ethyl-gamma-methylpimelic acid which had been formed was separated therefrom. The filter cake was treated with dilute sulfuric acid and an additional amount of the desired acid recovered. The yield of this acid was 400 parts (99%). It was a crystalline product melting at 114° C.

*Example 2*

A mixture of 200 parts by weight of sodium hydroxide pellets, 1800 parts of diethylene glycol, and 400 parts of gamma-acetyl-gamma-methylpimelic acid was warmed and stirred in a reaction vessel until most of the solid material had been dissolved. Then 300 parts of 85% hydrazine hydrate were slowly added. When the exothermic reaction which ensued had subsided, the reaction mixture was heated with reflux for 1.5 hours. There was then distilled from the reaction vessel water and excess hydrazine sulfate and the temperature was carried to 200° C. The reaction mixture was heated with reflux for five hours and then cooled. The sodium salt of the desired acid appeared as crystals which were separated by filtration. The crystals were dissolved in water and the solution thereof acidified to a pH of 3 with concentrated hydrochloric acid. The solution was cooled and gamma-ethyl-gamma-methylpimelic acid separated by filtration. This product was recrystallized from water to give a pure product melting at 115°–116° C. and corresponding in composition to gamma-ethyl-gamma-methylpimelic acid. The yield was 60%.

*Example 3*

A mixture of 202 parts by weight of gamma-ethyl-gamma-methylpimelic acid, 245 parts of butanol, 40 parts of sulfuric acid, and 76 parts of toluene was heated in a reaction vessel equipped with stirrer, condenser, thermometer, and water separator. There were taken off 22 parts of water. The reaction mixture was then cooled and treated with a saturated sodium carbonate solution. The layers which had formed were separated. The ester layer was washed with water, separated, and heated with activated charcoal. This mixture was filtered hot and distilled at low pressure. The fraction distilling at 171°–173° C./1.2 mm. corresponded in composition to dibutyl gamma-ethyl-gamma-methylpimelate. It was a water-clear liquid.

*Example 4*

A mixture of 195 parts of 2-ethylhexanol, 100 parts of gamma-ethyl-gamma-methylpimelic acid, 20 parts of sulfuric acid, and 40 parts of toluene was heated in a reaction vessel as in the previous example. After 18 parts of water had been separated, the reaction mixture was cooled and washed with a sodium carbonate solution. The ester layer was separated, washed with water, and treated while hot with charcoal. The product was then stripped of more volatile materials and subjected to distillation in a short-path still, which was heated at 200° C. with a pressure of 0.15 mm. The product corresponded in composition to di-2 - ethylhexyl gamma - ethyl-gamma-methylpimelate.

The procedures which have just been described are generally applicable to the preparation of esters. The various butyl, amyl, and hexyl esters are distillable under reduced pressure as in Example 2, while the heptyl, octyl, and nonyl esters are desirably obtained as in Example 3. It is not necessary to distill these high-boiling esters for some purposes, particularly where a trace of color is unimportant. The ester may be treated with charcoal, stripped of more volatile materials, and recovered as a residue.

The high boiling points of these esters are advantageous in their use as plasticizers. They have good heat stability. They do not contribute to the darkening of resins plasticized with them when these resins are heated for one to seven hours. The gamma-ethyl-gamma-methylpimelates have good resistance to ultraviolet light and are distinctly better in this respect than the corresponding products containing an acetyl group.

Perhaps, the most striking change from the corresponding acetylated esters is evident from consideration of the effects on low temperature properties of plasticized resins. A standard formulation of 35 parts of plasticizer, 62.5 parts of polyvinyl chloride, 1.5 parts of basic lead carbonate, and one part of stearic acid was used. The test samples were evaluated by the Kemp bend-brittle test. With dibutyl gamma-acetyl-gamma-methylpimelate the bend-brittle point was —27° C. With dibutyl gamma-ethyl-gamma-methylpimelate this point was —46° C. while with di-2-ethylhexyl gamma-ethyl-gamma-methylpimelate it was —48° C. With other esters of gamma-ethyl - gamma - methylpimelic acid and monohydric alcohols of four to nine carbon atoms the bend-brittle point is similarly in the range of —45° C. to —50° C.

By the selective reduction of gamma-acetyl-gamma-methylpimelic acid there is obtained gamma - ethyl-gamma-methylpimelic acid. Its highly branched chain imparts unique properties to both the acid and its derivatives. Esters of this acid are obtained by reaction with alcohols. The esters formed with monohydric, saturated, non-tertiary, aliphatic alcohols of four to nine carbon atoms form a class of new compounds with interesting properties which favor their application as plasticizers where low temperature flexibility, resistance to heat, and resistance to light are desirable.

The new compounds are of the formula

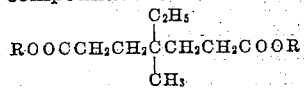

where R is hydrogen or a hydrocarbon group, particularly a non-tertiary alkyl group of four to nine carbon atoms.

We claim:

A method of preparing gamma-ethyl-gamma-methylpimelates which comprises treating gamma-acetyl-gamma-methylpimelic acid with an excess of an alkali metal hydroxide in the presence of a high-boiling organic solvent, adding an excess of hydrazine hydrate thereto, and heating the resulting mixture, with removal of water and excess hydrazine hydrate, up to 195° C.–220° C.

MARGARET I. ROBINSON.
ROBERT W. AUTEN.

REFERENCES CITED

The following references are of record in the file of this patent:

Bardhan et al.: Jour. Chem. Soc., London, 1932, 2798–2800.

Miller et al.: Jour. Am. Chem. Soc., 58, 787–791 (1936).